United States Patent [19]
Kido et al.

[11] 3,767,920
[45] Oct. 23, 1973

[54] REFLECTION TYPE RADIATION THICKNESS METER

[75] Inventors: Hiroshi Kido; Sadakatsu Saito, both of Kawasaki; Toshiharu Kimoto, Tokyo, all of Japan

[73] Assignee: Tokyo Shibaura Electric Co. Ltd., Kawasaki-shi, Japan

[22] Filed: Aug. 16, 1971

[21] Appl. No.: 172,277

Related U.S. Application Data

[63] Continuation of Ser. No. 860,987, Sept. 25, 1969, abandoned.

[52] U.S. Cl................250/359, 250/52, 250/83.6 R
[51] Int. Cl. .......................................... G01n 23/00
[58] Field of Search............ 250/52, 83.3 D, 83.6 R

[56] References Cited
UNITED STATES PATENTS

| | | | |
|---|---|---|---|
| 2,763,790 | 9/1956 | Ohmart.................. | 250/83.3 D X |
| 2,926,257 | 2/1960 | Friedman................ | 250/83.3 D X |
| 2,964,633 | 12/1960 | Bernstein................ | 250/83.3 D X |
| 3,460,030 | 8/1969 | Brunton et al............ | 250/83.3 D X |
| 3,482,098 | 12/1969 | Mangan................... | 250/83.3 D |

*Primary Examiner*—Archie R. Borchelt
*Attorney*—Flynn & Frishauf

[57] ABSTRACT

A thickness measuring apparatus includes a radiation detector to provide an ionization current corresponding to radiation reflected by a substance whose thickness is to be measured and placed on a substrate sufficiently thick to saturate radiation reflected therefrom, and a reference unit to provide an electric quantity of opposite polarity and equivalent to the ionization current generated by a sample of the same material as the substance sufficiently thick to saturate radiation reflected therefrom. A zero thickness point of the substance mounted on the substrate upon actual determination is so pre-adjusted, before actual determination, as to define the output level from the radiation detector which faces a sample of the same material as the substance sufficiently thick to saturate radiation reflected therefrom. The difference between the ionization current from the radiation detector which faces the substance placed on the substrate and whose thickness is to be measured substituting for the sample following the pre-adjustment and the electric quantity from the reference unit is applied to an indicating meter through a logarithmic amplifier.

9 Claims, 6 Drawing Figures

REFLECTION TYPE RADIATION THICKNESS METER

This is a Continuation of U.S. Ser. No. 860,987, filed Sept. 25, 1969, now abandoned.

BACKGROUND OF THE INVENTION

This invention relates to a novel apparatus for measuring the thickness of a substance utilizing reflected radiation, and more particularly to a thickness gauge suitable for measuring the thickness of a substance which is deposited on a substrate of a thickness sufficient to obtain saturated reflected radiation when radiation is impinged thereon.

It has been known in the art to measure the thickness of substances (such as an iron plate, various metal plates or a plated layer deposited on a substrate) having a thickness sufficient to obtain saturated reflected radiation when radiation is impinged thereon, by detecting both the quantity of the radiation projected upon the substance from a radiation source and the quantity of radiation reflected therefrom utilizing a reflection type radiation detector.

The quantity of reflected radiation varies exponentially as shown in FIG. 1 dependent upon whether the atomic number of the substance to be measured is larger or smaller than that of the substrate.

Considering only the substrate, not being deposited with any substance thereon, the quantity of the reflected radiation increases exponentially as the thickness of the substrate increases as shown by curve 11 (FIG. 1), until a saturating point $T_s$ is reached which is determined by the nature of the radiation and the material of the substrate. Where a substance, the thickness of which is to be measured, consisting of a metal plate or a plated layer is deposited on the substrate having such a saturating thickness and where the atomic number of the substance is denoted by $Z_A$ and that of the substrate by $Z_B$, then the quantity of the reflected radiation will increase exponentially with the thickness t of the substance as shown by curve 121 (FIG. 1) when $Z_A > Z_B$. If $Z_A < Z_B$, the quantity of the reflected radiation will decrease exponentially as the thickness $t$ of the substance increases, as shown by curve 122 (FIG. 1).

Accordingly, the relationship between the thickness t of the substance to be measured and the quantity I of the reflected radiation can be expressed as follows:

$$I = I_A - (I_A - I_B)l^{-\mu t} = I_B (Z_A/Z_B)^n - [(Z_A/Z_B)^n - 1]l^{-\mu t} \quad (1)$$

where $I_A$ represents the quantity of the saturating radiation reflected by the substance to be measured; $I_B$ represents the quantity of the saturated radiations reflected by the substrate; and $\mu$ represents the radiation absorption coefficient of the substance to be measured.

For this reason, with the present day thickness gauges utilizing these phenomena, it is very difficult to accurately determine the thickness $t$ of the substance not only because the detected quantity of the reflected radiation varies exponentially in accordance with the change in the thickness of the substance being measured, but also because the quantity of the detected radiation reflected by the substance and that of radiation reflected by the substrate vary in different manners.

In order to accurately determined the thickness of the substance it is essential to display on an indicating meter the variation in the thickness of the substance as a quantity which varies linearly in direct proportion to said variation. Where the quantity of the detected radiation reflected by the substance to be measured varies exponentially with the variation in the thickness of the substance as above described, it has been proposed to feed the ionization current from a reflection type radiation detector responsive to the quantity of the reflected radiation to a logarithmic amplifier to obtain an output which varies substantially linearly in proportion to the ionization current, and to display the output from the logarithmic amplifier on an indicating meter.

However, in such a reflection type radiation detector wherein the thickness of a substance deposited on a substrate having a saturable thickness is measured by means of a detector which produces an ionizing current in response to the quantity of radiation which are irradiated upon the substance from a radiation source and reflected therefrom, where the measuring device is constructed and arranged such that the thickness of the substance is measured by taking as the reference point the value of the ionization current produced by the radiation detector corresponding to the quantity of radiation reflected by the substrate having a saturable thickness (namely, in the case where the thickness of the substance to be measured is zero), we have found that even with the logarithmic amplifier, the quantity displayed by the indicator does not vary linearly in proportion to the variation in the thickness of the substance to be measured. Hence accurate measurement cannot be provided. In the case, where the thickness of the substance deposited on the substrate having a saturable thickness is measured utilizing the zero point of the thickness of the substance to be measured as the reference point as above described, it is thought that great difficulty will be caused by complicated interference between radiation reflected by the substrate and radiation reflected by the substance which results in reflected radiation of different characteristics.

It is therefore an object of this invention to provide a novel apparatus capable of accurately measuring the thickness of a substance to be measured without being affected by the presence of the substrate.

SUMMARY OF THE INVENTION

According to this invention, apparatus for measuring the thickness of a substance comprises a radiation detector to provide an ionization current corresponding to radiation reflected by a substance to be measured and placed on a substrate having a thickness sufficient to obtain saturated reflected radiation when irradiated, a reference unit to provide an electrical quantity representing the ionization current provided by a sample of the same material as the substance to be measured and having a thickness sufficient to obtain saturated incident radiation, a logarithmic amplifier connected to receive the difference between said ionization current and said electric quantity and an indicating meter responsive to the output from said logarithmic amplifier to provide an indication directly proportional to the thickness of the substance being measured.

DESCRIPTION OF THE PREFERRED EMBODIMENTS

Figure 2:
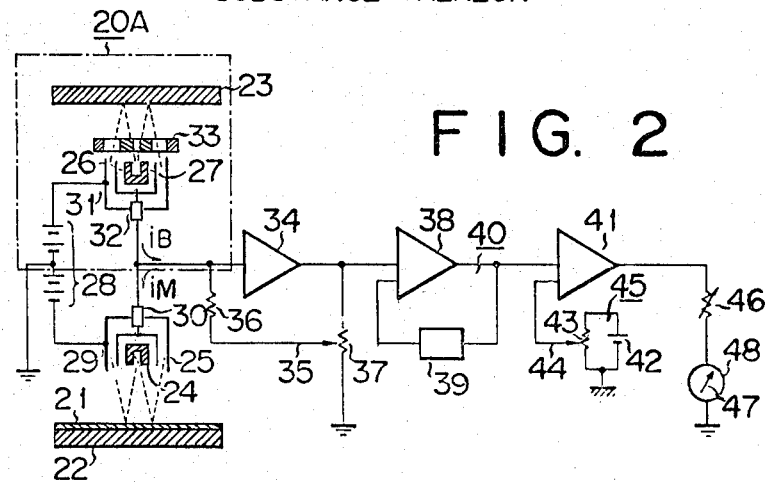
FIG. 2 is a schematic block diagram of one embodiment of a thickness measuring apparatus according to this invention.

Referring now to FIG. 2 showing a schematic block diagram of one embodiment of a thickness measuring apparatus of the present invention, there is shown a substance or layer 21 whose thickness is to be measured and which is deposited upon a substrate 22 which is thick enough to obtain saturated reflected radiation when irradiated. The substance 21 may be a plated metal layer deposited upon the substrate 22 or any other metal plate such as an iron plate. However, it should be understood that the substance need not necessarily be fixed to the substrate but may be continuously moved along the upper surface of the substrate 22. Confronting and spaced from the substrate 22 is a reference body 23 which is so designed as to produce reflected radiation of the same quantity as those reflected by the substance to be measured and which is thick enough to obtain saturated reflected radiation when radiation is projected thereon. A pair of radiation detectors 25 and 27 including sources of radiation 24 and 26 are disposed to face the substance 21 to be measured and reference body 23, respectively. As shown, positive and negative terminals of a high voltage DC source 28 with its neutral point grounded are respectively connected to terminals 29 and 31 of the pair of radiation detectors 25 and 27. Further, these radiation detectors are provided with collector electrode terminals 30 and 32 adapted to detect ionization currents corresponding to the quantities of radiation which are reflected from the substance 21 and the reference body 23 when substance 21 and reference body 23 are irradiated from respective sources 24 and 26. If desired, there may be provided an adjusting plate 33 having perforations of appropriate size between the reference body 23 and the corresponding radiation detector 27 in the path of the incident radiation from source 26 and the reflected radiation from the reference body 23, so as to adjust the quantity of reflected radiation to be detected by the detector 27. As will be discussed later more in detail, the radiation detector 27, adjusting plate 33 and reference body 23 encircled by dot and dash lines 20A comprise a reference unit providing a reference value.

Collector electrode terminals 30 and 32 of detectors 25 and 27 are commonly connected to an input terminal of a pre-amplifier 34. The output of the pre-amplifier 34 is grounded through a variable resistor 37 with its movable tap 35 connected to the input of the pre-amplifier through a resistor 36 of suitable value, which may be provided when desired. The operation of the pre-amplifier 34 with resistor 36 will be described later. A negative feedback circuit 39 including a circuit element having a desired logarithmic characteristic such as a diode is connected between input and output terminals of an amplifier 38 to form a logarithmic amplifier 40. The output from this amplifier 40 is supplied to one input of a differential amplifier 41 which may be provided when desired. The other input terminal of the differential amplifier 41 is connected to the movable tap 44 of a second variable resistor 43 connected across a DC source 42, the resistor 43 and source 42 comprising a variable DC source 45. The output terminal of the differential amplifier 41 is connected to an indicating meter 48 (such as the moving coil or moving ion type) having a pointer 47 which deflects uniformly in direct proportion to the value of the input current feed thereto. A variable resistor 46 may be included in series with meter 48 when desired for the purpose of adjusting the sensitivity.

The above described thickness gauge operates as follows.

Before actual measurements are made, the following preliminary calibration is performed.

Figure 1:
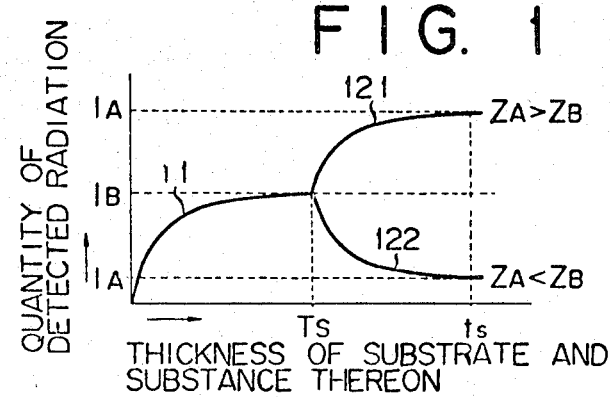
FIG. 1 shows characteristic curves illustrating the relationship between the thickness of a substrate and the deposited substance to be measured, and the detected quantity of reflected radiation when the thickness of the substance is measured by a reflection type radiation detector.

A sample solely consisting of the same material as the substance 21 and having a sufficient thickness to provide saturated reflected radiation when irradiated from the source 24, is substituted for the substance 21 to be measured. Then, regardless of the presence or absence of the substrate the detector 25 will detect the amount of the saturated reflected radiation $I_A$ as can be understood from FIG. 1. Then the amount of radiation emitted from the source 26 is adjusted by the adjusting plate 33 in such a manner that the output ionization current $i_B$ derived from the collector electrode terminal 32 of the detector 27 included in the reference unit 20A will be equal to the output ionization current $i_M$ derived from the collector electrode terminal 30 of the detector 25. Since output ionization currents $i_B$ and $i_M$ have opposite polarities, the input to pre-amplifier 34 is zero under these conditions. Then another sample consisting only of the same material as the substate 22 and having a thickness sufficient to obtain saturated reflected radiation when irradiated from the source 24 is substituted for the first mentioned sample. Then, the detector 25 will detect the quantity of the saturated reflected radiation $I_B$ as can be noted from FIG. 1. Under these circumstances, there is a maximum difference between the ionization current $i_B$ from the collector electrode terminal 32 of the detector 27 of the reference unit 20A and the ionization current $i_M$ from the collector electrode terminal 30 of the detector 25. Thus, a maximum input voltage is applied to one terminal of the differential amplifier 41 successively through the pre-amplifier 34 and logarithmic amplifier 40. If the movable tap 44 of the variable resistor 43 is adjusted such that the voltage applied to the other input terminal of the differential amplifier 41 from the variable DC source 45 will be equal but opposite in polarity with respect to the maximum voltage supplied to the first mentioned input, the differential amplifier would provide a zero output, and hence the deflection of the pointer 47 of meter 48 would also be zero.

Figure 3:
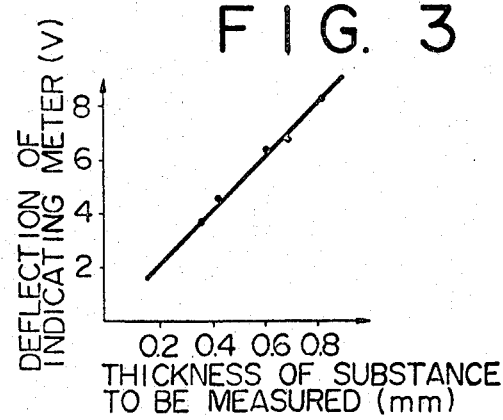
FIG. 3 is a graph showing the relationship between the deflection of an indicating meter and the thickness of a substance to be measured obtained by the apparatus of the present invention.

Subsequent to this calibration, an actual measurement is conducted with a sample or test substance 21, the thickness of which is to be measured, deposited or placed upon a substrate 22 which has a sufficient thickness to obtain saturated reflected radiation when irradiated from the source 24 placed in the measuring position shown in FIG. 2. When the thickness of the substance 21 on the substrate is measured by the method described hereinabove, the indicating meter 48 will not be deflected when the thickness of the substance 21 is zero or when there is no substance on the substrate 22. The deflection of the pointer 47 of meter 48 increases as the thickness of the substance increases. In accordance with this invention, the reference point of measurement corresponding to the zero deflection of the meter 48 is not selected to correspond to zero thickness of the substance being measured, but instead, the reference point of measurement is so selected as to have the same value as the ionization current from the substance having a sufficient thickness of obtain such saturated reflected radiation. Thus, the effect caused by the presence of the substrate is greatly alleviated. As a result, the deflection of the indicating meter 48 varies linearly and substantially proportionally to only the thickness of the substance to be measured, so that the thickness of the substance 21 can be correctly measured with a high degree of accuracy. FIG. 3 is a graph illustrating the relationship between the thickness of the substance 21 to be measured and the deflection of the indicating meter 48.

However, as noted above, since the polarity of the input signal to the pre-amplifier 34 is determined by the relative magnitude of the atomic numbers $Z_A$ and $Z_B$ of the substance 21 and the substrate 22, the polarity of the DC source 28 for both detectors 25 and 27 should be correspondingly determined to assure proper polarity of the input signal to the pre-amplifier 34.

On the contrary, when the deflection of the meter 48 is a maximum when the thickness of the substance is zero and decreases linearly with an increase of the thickness, it is possible to directly connect the meter 48 to the output of the logarithmic amplifier 40, thereby eliminating the differential amplifier 41.

While in the above example the thickness of the substance being measured is directly measured, in many applications it is often desirable to measure the deviation of the thickness from a standard value. In such case, the voltage applied from the variable DC source 45 to said other input of the differential amplifier 41 is adjusted to be equal to, but opposite in polarity with respect to, the voltage applied to the first input terminal of the differential amplifier which corresponds to the sample of the standard thickness. Then, where the thickness of the substance to be measured is equal to the standard thickness, the deflection of the meter 48 will be zero and its pointer 47 will deflect linearly in one direction or the other substantially in proportion to the deviation from the standard thickness, thus measuring the thickness of the substance in terms of the magnitude of the deviation from the reference (or standard) value.

In this embodiment, the resistor 36 and the first variable resistor 37 comprise a well known negative feedback network. In this network, a portion of the input current to the pre-amplifier 34 is by-passed to ground through the resistor 36 and a portion of the resistor 37 between its movable tap 35 and the grounded terminal, while the remaining portion of the input is amplified, and reversed in polarity by the pre-amplifier 34, and is then applied to the variable resistor 37. This improves the response characteristics of the amplifier circuit against changes of environmental conditions such as ambient temperature.

Although in this embodiment, in order to obtain an ionization current for comparison, a radiation detector responsive to reflected radiation is employed, it is also possible to use a radiation detector responsive to radiation transmitted through a sample. Further, instead of the above described perforated adjusting plate 33, any well known radiation adjusting mechanism may be used.

Figure 4:
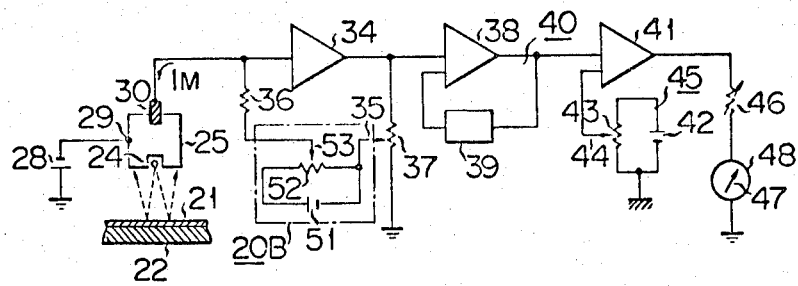
FIG. 4 is a schematic block diagram of another embodiment of the present invention.

FIG. 4 shows a modified embodiment of this invention. In this embodiment, the complicated reference unit 20A shown in FIG. 2 is replaced by a simplified reference unit 20B of the following construction. A variable resistor 52 is connected across a source of direct current such as a battery 51. One end of the variable resistor 52 is connected to the movable arm 35 of the first variable resistor 37 while the movable arm 53 of the variable resistor 52 is connected to the input terminal of the pre-amplifier 34 through the resistor 36. In this modification, when a sample of the same material as the substance being measured and having a sufficient thickness to provide such saturated reflected radiation is substituted for the substance 21 to be measured for calibration, it is necessary to adjust the movable arm 53 of the variable resistor 52 so as to provide a voltage which operates to cancel the voltage drop across the resistor 36 created by the ionization current $i_M$ from the collector electrode terminal of the detector 25, so as to reduce the input voltage to the pre-amplifier 34 to zero. Then, similar to the first embodiment, it is possible to accurately measure the thickness of the substance 21 on the substrate 22 which has a thickness sufficient to obtain such saturated reflected radiation. In FIG. 4, elements corresponding to those shown in FIG. 2 are designated by the same reference numerals so that their description is believed unnecessary.

The construction of the DC source utilized as the reference unit is not limited to that shown in FIG. 4 and it is to be understood that any equivalent may be used. Thus, for example, the reference unit 20B may be associated with the logarithmic amplifier 40 instead of the pre-amplifier 34.

Figure 5:
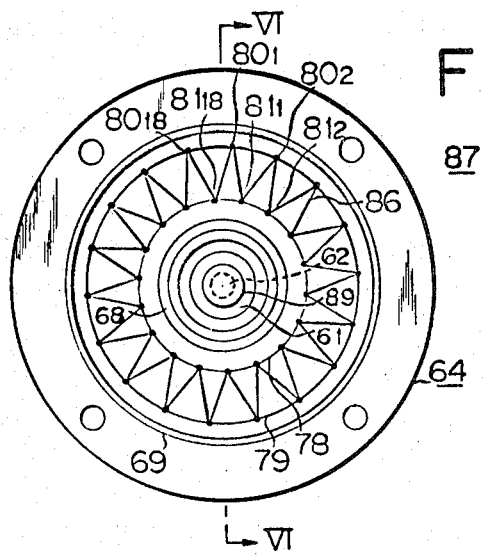
FIG. 5 is a front view of one example of a reflection type radiation detector suitable for use in this invention.
Figure 6:
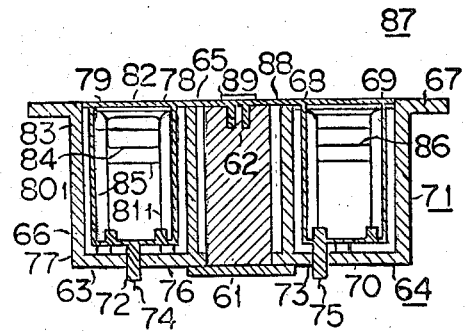
FIG. 6 is a sectional view of the detector shown in FIG. 5 taken along a line VI — VI.

FIGS. 5 and 6 illustrate one example of a practical construction of a novel radiation detector which can be used in either FIG. 2 or 4. As shown, the detector comprises a solid cylindrical radiation source holder 61 made of a radiation shielding material such as lead and provided at its top with a blind hold 62 for receiving a source of radiation, not shown. The radiation source holder 61 is sealed in an inner cylinder 25 of a concentric double walled protective casing 64 made of iron or aluminum. The holder 61 extends through the bottom plate 63 of the protective casing 64. An outwardly extending flange 67 is formed on the top of the outer cylinder 66 of the protective casing. In the space between the inner and outer cylinders 65 and 66 of the protective casing 64 is contained a high voltage electrode assembly 71 comprising concentric inner and outer cylinders 68 and 69 and a bottom plate 70. The electrode assembly 71 is provided with a pair of insulating bushings 72 and 73 extending through the bottom plate 63 of the protective casing. Conductors 74 and 75 are provided to extend through insulating bushings 72 and 73. Conductor 74 is connected to the high voltage electrode assembly 71 whereas the other conducter 75 is connected to a collector electrode 86 which is described hereinbelow. On the bottom plate 70 of the electrode assembly 71 are mounted a pair of concentric annular terminals 76 and 77. A pair of annular metal rings 78 and 79 are mounted on the upper end of the high voltage electrode assembly 71 to oppose terminals 76 and 77 respectively. A plurality of (for example eighteen) metal wires $80_1, 80_2, ..., 80_{18}$ and $81_1, ..., 81_{18}$ are provided between opposing terminals 76 and 77 and annular metal rings 78 and 79, respectively, at positions equally dividing the circumference thereof. A plurality of metal wires (for example four) 82, 83, 84 and 85 are provided between metal wires $80_1, ..., 80_{18}$ and $81_1, ..., 81_{18}$ at different levels. These metal wires 82, 83, 84 and 85 are electrically connected successively in the order of $80_1 - 81_1 - 80_2 - 81_2, ..., 81_{18} - 80_{18}$, for example, to form a wire net shaped collector electrode assembly 86 which is electrically connected to the conductor 75 extending through insulating bushing 73 for the purpose of deriving out the ionization current. The protective casing 64, the high voltage electrode assembly 71 and the collector electrode assembly 86 comprise an ionization chamber 87. The upper opening of the ionization chamber 87 or protective casing 64 is sealed by a foil 88 such as a film of polyethylene terephtharate vapor deposited with aluminum. Inert gas such as argon and the like is sealed in the ionization chamber 87. A shutter 89 is provided in front of the blind hole 62 for receiving the radiation source of the holder 61 to selectively open and close the blind hole 62 through the foil 88.

In operation, a suitable high voltage DC source is connected between the high voltage electrode assembly 71 and the protective casing 64 while the collector electrode assembly 86 is connected to the indicating meter 48 via an amplifier circuit including a logarithmic amplifier 40 as shown in FIGS. 2 or 4. The sample to be measured is brought to face the window of the ionization chamber 87 sealed by foil 88. Then the shutter 89 is opened to irradiate the sample from the radiation source contained in the holder 61. Then radiation reflected by the sample will enter into the ionization chamber 87 through its window to ionize the argon gas to supply an ionization current corresponding to the thickness of the sample through the collector electrode assembly 86 to cause the pointer 47 of the meter 48 to deflect in a given direction by a predetermined angle, thus directly measuring the thickness of the sample.

The novel radiation detector comprises a double walled cylindrical protective casing with its bottom closed, a solid cylindrical radiation source holder having a blind hole at its top for receiving the radiation source and hermetically sealed in the protective casing, a high voltage electrode assembly similarly of double walled cylindrical construction with its bottom closed, said electrode assembly being disposed in the space between the inner and outer cylinders of the protective casing and electrically insulated therefrom, and a wire net shaped cylindrical collector electrode assembly disposed close to the high voltage electrode assembly. This construction readily permits mounting and removing the source of radiation as well as safe handling of dangerous radiation sources. In addition, maintenance and inspection are very simple. Moreover, as radiation reflected from the sample can be evenly collected with high efficiencies it is possible to form a plateau at a relatively low voltage. For this reason, the effect of variations in the source voltage and in the spacing between the sample and detector upon the accuracy of the measurement can be greatly minimized.

We claim:

1. Apparatus for measuring the thickness of a substance utilizing reflected radiation comprising:
    a substrate sufficiently thick to saturate radiation reflected therefrom and receiving a substance whose thickness is measured thereon;
    a source of radiation to irradiate said substance;
    a radiation detector for receiving radiation reflected from said substance to provide an ionization current corresponding to the quantity of the received radiation;
    a reference unit including means for producing an electric quantity of opposite polarity and of equal magnitude to the ionization current generated by a sample of the same material as said substance but which is sufficiently thick to saturate radiation reflected therefrom;
    a first pre-adjusting means for defining a zero thickness point of said substance by causing the ionization current from said radiation detector to be of opposite polarity and of equal magnitude to the electric quantity generated by said reference unit upon receipt, by said radiation detector before actual measurement, of radiation reflected from another sample of the same material as said substance and which sample is sufficiently thick to saturate radiation reflected therefrom;
    a logarithmic amplifier supplied with an electrical quantity corresponding to the difference between said output electrical quantities from said reference unit and said radiation detector facing said substance mounted on said substrate which is substituted for said another sample, following said first preadjustment; and
    an indicating meter for providing readings substantially linearly proportional to the magnitude of the output signal from said logarithmic amplifier.

2. Apparatus for measuring the thickness of a substance utilizing reflected radiation comprising:
    a substrate sufficiently thick to saturate radiation reflected therefrom and receiving a substance whose thickness is to be measured thereon;
    a source of radiation to irradiate said substance;
    a radiation detector for receiving radiation reflected from said substance to produce an ionization current corresponding to the quantity of the received radiation; a reference unit including means for producing an electric quantity of opposite polarity and of equal magnitude to the ionization current generated by a sample of the same material as said substance but which is sufficiently thick to saturate radiation reflected therefrom;
    a logarithmic amplifier supplied with an electrical quantity corresponding to the difference between said output electrical quantities from said reference unit and said radiation detector;
    a differential amplifier coupled to the output of said logarithmic amplifier, a signal from the logarithmic amplifier being applied to one input terminal thereof and a variable DC source being connected to the other input terminal thereof;
    a first pre-adjusting means for defining a zero thickness point of said substance by causing ionization current from said radiation detector to be of opposite polarity and of equal magnitude to the electric quantity generated by said reference unit upon receipt, by said radiation detector before actual measurement, of radiation reflected from another sample of the same material as said substance but which is sufficiently thick to saturate radiation reflected therefrom;

a second pre-adjusting means for defining a zero level of the output from said differential amplifier by adjusting the input signal to at least one input terminal of said differential amplifier such that the current fed thereto from said logarithmic amplifier is of opposite polarity and of equal magnitude to the electric current applied to the other input terminal of said differential amplifier from said variable DC source upon receipt, by said radiation detector further following said first preadjustment and before actual measurement, of radiation reflected from still another sample of one of a sample of the same material as said substrate and which is sufficiently thick to saturate radiation reflected therefrom and another sample of the same material as said substance but having a predetermined thickness; and an indicating meter for providing a display substantially linearly proportional to the magnitude of the resultant output signal obtained through said logarithmic amplifier and differential amplifier following said first and second pre-adjustments.

3. Apparatus according to claim 2 wherein said zero level of the output from said differential amplifier is set as the output level of said differential amplifier corresponding to supplying to said one input terminal thereof an ionization current generated by said radiation detector which received, before actual determination, radiation reflected from the same material as said substance but of a standard thickness, whereby readings on said indicating meter represent the degree to which the thickness of said substance mounted on said substrate deviates from a standard value corresponding to said standard thickness.

4. Apparatus according to claim 1 wherein said reference unit comprises a calibrated member of the same material as said substance and which is sufficiently thick to saturate incident radiation, and a radiation detector facing said calibrated member.

5. Apparatus according to claim 2 wherein said reference unit comprises a calibrated member of the same material as said substance and which is sufficiently thick to saturate incident radiation, and a radiation detector facing said calibrated member.

6. Apparatus according to claim 1 including an amplifier coupled to the input of said logarithmic amplifier to pre-amplify the electrical quantity supplied to said logarithmic amplifier, and wherein said reference unit comprises a DC source disposed in a negative feedback network connected in parallel between the input and output terminals of said amplifier.

7. Apparatus according to claim 2 including an amplifier coupled to the input of said logarithmic amplifier to pre-amplify the electrical quantity supplied to said logarithmic amplifier, and wherein said reference unit comprises a DC source disposed in a negative feedback network connected in parallel between the input and output terminals of said amplifier.

8. Apparatus according to claim 1 wherein said radiation detector comprises:

a double walled cylindrical protective casing having a closed bottom;

a solid cylindrical holder at the center of said protective casing, said holder being provided with an opening for receiving a source of radiation on its top;

a high voltage electrode assembly of double walled cylindrical construction and insulatedly supported in said protective casing, the bottom of said high voltage electrode assembly being closed; and a wire net shaped collector electrode assembly mounted adjacent to said electrode assembly.

9. Apparatus according to claim 2 wherein said radiation detector comprises:

a double walled cylindrical protective casing having a closed bottom;

a solid cylindrical holder at the center of said protective casing, said holder being provided with an opening for receiving a source of radiation on its top;

a high voltage electrode assembly of double walled cylindrical construction and insulatedly supported in said protective casing, the bottom of said high voltage electrode assembly being closed; and a wire net shaped collector electrode assembly mounted adjacent to said electrode assembly.

* * * * *